F. A. HOWARD.
APPARATUS FOR MANUFACTURING GLASS INSULATORS FOR SPARK PLUGS.
APPLICATION FILED JULY 28, 1919.
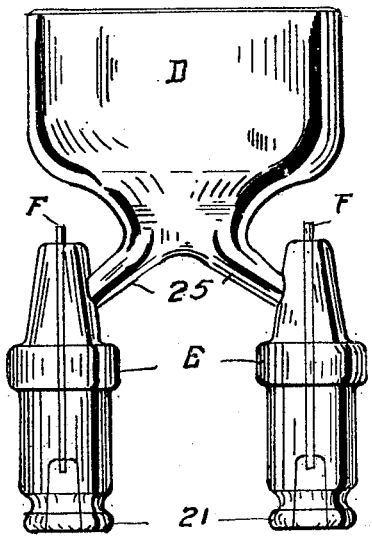
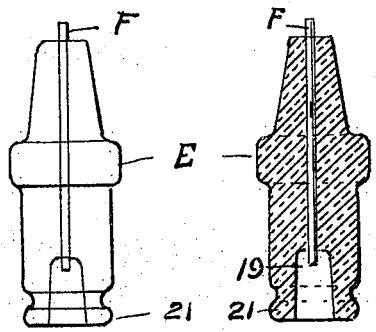

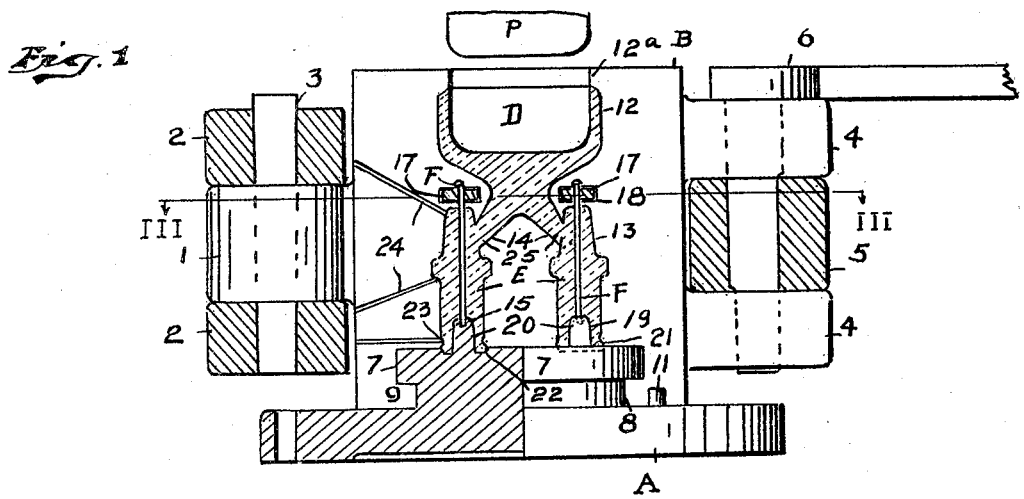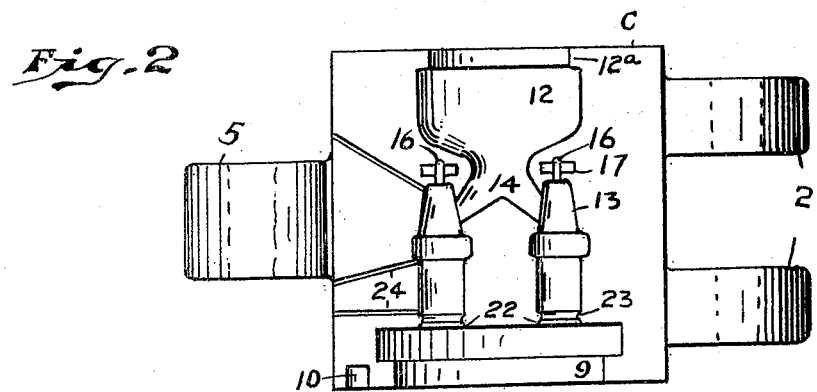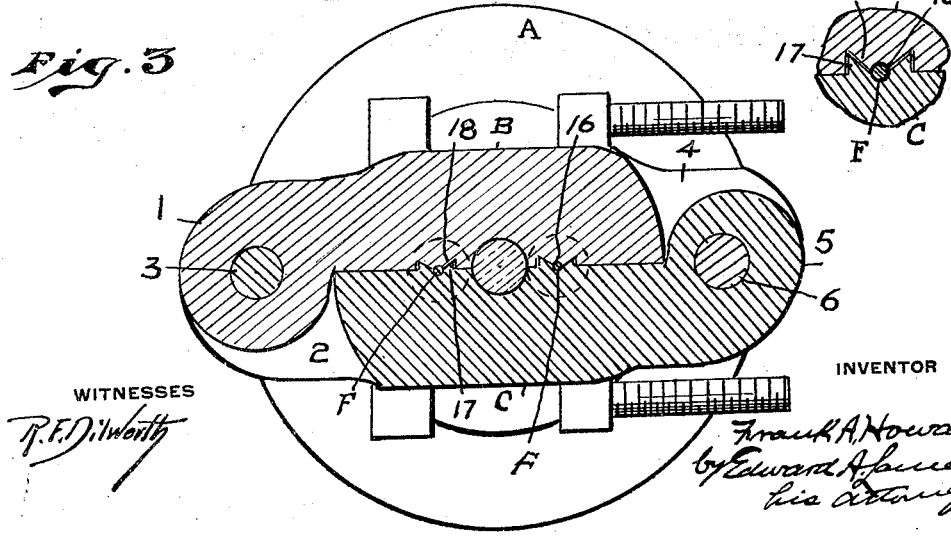

UNITED STATES PATENT OFFICE.

FRANK A. HOWARD, OF SWISSVALE BOROUGH, PENNSYLVANIA.

APPARATUS FOR MANUFACTURING GLASS INSULATORS FOR SPARK PLUGS.

1,405,034. Specification of Letters Patent. Patented Jan. 31, 1922.

Application filed July 28, 1919. Serial No. 313,913.

*To all whom it may concern:*

Be it known that I, FRANK A. HOWARD, citizen of the United States, and residing in the borough of Swissvale, in the county of Allegheny and State of Pennsylvania, have invented or discovered new and useful Improvements in Apparatus for Manufacturing Glass Insulators for Spark Plugs, of which the following is a specification.

My invention consists in a new apparatus for casting glass insulators for spark plugs.

Of late years, there have been many attempts to substitute heat resisting glass for porcelain in insulators for spark plugs, owing to the superior qualities of the glass, but this substitution has not become general owing to the difficulty experienced in embedding the central electrode in the insulator. To obtain satisfactory results the electrode must be positioned axially of the insulator, but in the operation of forming the insulator of glass the tendency is to bend or force aside the electrode wire, so that it is distorted and out of axial alinement, and it is also frequently so injured that its efficiency is impaired.

The object which I have in view is the provision of a practical apparatus by means of which glass insulators for spark plugs may be manufactured cheaply, on a quantity basis, and of such quality as to overcome the difficulties above noted.

Generally speaking, my improved process consists in first mounting the wire electrode vertically in a mold cavity with its ends secured against displacement and then introducing the molten glass under pressure into the mold at the side of the cavity and preferably at an acute angle to the electrode, the insulator being formed in a vertically disposed position.

To enable me to form the insulators in quantities I deposit the batch of glass in a feed cavity in the upper part of the mold in the lower portion of which mold are provided a plurality of insulator cavities each connected with the feed cavity by a separate passage leading downwardly from the feed cavity and entering the side of the insulator cavity and then introducing a pressing plunger into the feed cavity, thus filling the individual insulator cavities.

My improved apparatus provides convenient means for working my process.

In the accompanying drawings, which are however merely intended to illustrate the principles of my invention without limiting the scope thereof to the construction shown, Fig. 1 is an inside elevation of one member or half of the hinged mold mechanism which I prefer to use, the mold base being shown in full except where partially broken away in section for the sake of clearness, and the formed body of glass in the mold being shown in section; Fig. 2 is an inside view of the other mold member or half; Fig. 3 is a horizontal section taken along the line III—III in Fig. 1, showing the mold closed and filled with glass; Fig. 4 is an enlarged detail of features shown on smaller scale in Fig. 3; Fig. 5 shows the body of formed glass as it is removed from the mold, a pair of spark plug insulators being attached in an inverted position to the cup by necks of glass, and Figs. 6 and 7 are, respectively, an inverted elevation and an inverted longitudinal section of the finished insulator.

The following is a detailed description of the apparatus shown in the drawings.

A is a mold base or platform, and B and C are the two members or halves of a hinged mold, the members being pivotally connected together by the hinge ears 1 and 2 and the pintle 3. The fronts of the members are provided with pierced lugs 4 and 5 which interengage when the mold is closed and are locked by the pin 6.

The base A is provided with an integral or fixed raised mold bottom 7 about which the mold members B and C close, the said bottom 7 being undercut, as at 8, to receive the bottom flanges 9 of the mold members in the usual manner.

The front portions of the mold members B and C at the bottoms of their inner faces are provided with half sockets 10 which engage the centering pin 11 extending upwardly from the base A to properly center and position the mold as it is closed.

The inner faces of the mold members are recessed so as to coact, when the mold is closed to form the proper mold cavities.

Thus the upper parts of such members are recessed as at 12 so that when closed a feed cavity is formed wherein is pressed the glass cup D, Figs. 1 and 5, the upper end or mouth of said cavity being contracted by the coacting semi-annular lips or flanges 12ª into which the plunger P, Fig. 1, fits as it descends.

The lower portions of the mold halves are recessed, as at 13 to form when the mold is closed, the cavities for forming the insulators E, which insulators are formed with their axes vertically disposed.

In illustration in the drawings of my process and apparatus I have shown the insulators formed in the reverse position to that in which they are usually disposed when in use, that is upside down, and the insulators are also shown with an axial recess in one end, in use the upper or outer end, into which the electrode protrudes, but it will be understood that I do not confine myself to the form of insulator shown, but the illustration is used simply for clearness of illustration.

The insulator forming cavities as produced by the recessed mold members are closed at the bottom by the mold bottom 7.

Each insulator cavity is connected with the feed cavity by a passage which leads from the bottom of the feed cavity and enters the side of the insulator cavity at an acute angle to the axis of the latter. This angle should be as acute as possible. These passages are formed by the coacting grooves 14 in the inner faces of the mold elements B and C.

The mold bottom 7 is provided with steps or socket holes 15 which register with the axes of the insulator cavities when the mold is closed, and in these sockets are stepped the ends of the metal electrodes F to be embedded in the insulators to be formed. The other end of each of said electrodes is seated in a socket formed, when the mold is closed, by the two coacting, vertical grooves 16 in the faces of the mold members B and C, leading up from the insulator cavities and alined with their axes. To properly center the electrode so that the same will be held straight and the grooves will accurately encompass it as the mold closes, I provide one member, C, with bifurcated or forked projections 17 which extend on either side of the groove 16 on said member and seat when the mold is closed in corresponding recess 18 in the face of the other mold. Thus the arms of the fork 17 will encounter the upper end of the electrode F, as the mold is closing and will draw it into exact vertical alinement so that it will be snugly enclosed between and held by the coacting grooves 16.

Where the insulator is to be provided with a recess in one end, as for instance the recess 19, then I provide the mold bottom 7 with an upwardly extending post 20 of the proper shape to form said recess, which post extends upwardly into the insulator cavity. To form the bead 21 on the end of the insulator, the mold bottom around the base of the post may be provided with a groove 22 and the recesses 13 are provided with inwardly extending bottom flanges or lips 23.

Where the posts 20 are provided and the electrodes F are to extend but a short distance into the recesses, I may form the socket holes 15 in the top of the posts 20. These socket holes may be made as deep as necessary to obtain the desired protrusion of the electrode from the glass.

The working of my process in connection with the above described apparatus is as follows.

The mold being open, the electrodes F are stepped in place in the sockets 14 and the mold is now closed and locked, the upper ends of the electrodes being guided by the forks 17 into the sockets formed by the coacting grooves 16, thus firmly holding the electrodes in their vertical position. A batch of glass is now dumped into the feed or cup cavity formed by the coacting recesses 12 and the plunger P depressed, pressing the glass cup D and forcing the remainder of the glass down through the connecting passages into the cavities formed by the coacting recesses 13, filling said mold cavities around the exposed portions of the electrodes F and forming the insulators E with the electrodes embedded therein. The filling of the glass is shown in section in Fig. 1. Air ports formed by coacting grooves 24 in the faces of the mold members are provided to permit the escape of air in properly filling the mold.

The flow of the glass under pressure of the plunger P is such that the insulator or article cavities are properly and compactly filled with molten glass.

The downward flow of the glass into the insulator cavities causes it to fill around and embed the electrodes F without distorting or bending the same as would be the case were the glass to be admitted at right angles to the electrode and if the electrode were not held firmly in place at both ends.

The plunger is now elevated and the mold unlocked and opened and the glass will be found pressed into the form shown in Fig. 5, comprising the cup D connected by the downwardly extending necks 25 of glass to the finished insulators E which have the electrodes F embedded therein, and the whole supported on the posts 20. The glass mass may then be lifted from place and the glass necks 25 cut close to the insulators and the scars or stubs ground off.

The insulators are now ready for use.

For the purpose of illustration, I have shown a two insulator mold but it will be understood that the mold may be provided with but a single insulator cavity, or preferably by enlarging or elongating the feed or cup cavity and providing a row consisting of a plurality of insulator cavities, each connected with the feed cavity by a separate passage, I can successfully press or form a large number of insulators at one operation.

It is thus seen that glass insulators for spark plugs can be formed by my process and apparatus in large quantities and at small expense, and such insulators, when made of the proper character of heat resisting glass, form a cheaper and much superior insulator for spark plug use than do porcelain insulators for the same purpose.

Although, for the sake of clearness I have minutely described the embodiment of my invention shown in the accompanying drawings, I do not wish to limit myself thereby, but claim broadly:—

1. In apparatus for forming glass insulators for spark plugs, a one-piece mold bottom provided with a socket to receive the lower end of the electrode, hinged mold members coacting with said mold bottom and having their inner faces recessed to provide a mold cavity of proper contour to form the insulator in a vertically disposed position, coacting means carried by the several mold members adapted to engage the upper end of the electrode and hold it firmly in position when the mold is closed, and means for introducing the molten glass into said cavity.

2. In apparatus for forming glass insulators for spark plugs, a mold bottom provided with a socket to receive the lower end of the electrode, hinged mold members coacting with said mold bottom and having their inner faces recessed to provide a mold cavity of proper contour to form the insulator in a vertically disposed position, means for guiding the upper end of said electrode into proper alinement as the mold is closing, means carried by the mold members adapted to engage the upper end of the electrode and hold it firmly in position when the mold is closed, and means for introducing the molten glass into said cavity.

3. In apparatus for forming glass insulators for spark plugs, a mold bottom provided with a socket to receive the lower end of the electrode, hinged mold members coacting with said mold bottom and having their inner faces recessed to provide a mold cavity of proper contour to form the insulator in a vertically disposed position, means carried by the mold members adapted to engage the upper end of the electrode and hold it firmly in position when the mold is closed, means for guiding the electrode into engagement with said first mentioned means when the mold is closing, and means for introducing molten glass into said cavity.

4. In apparatus for forming glass insulators for spark plugs, the combination of a one-piece mold bottom provided with a plurality of sockets adapted to receive and support the ends of electrodes, hinged mold members resting on said mold bottom and having their abutting faces recessed to form, when said mold is closed, a mold cavity axially alined with each of said electrode sockets in said base, of proper contour for casting an insulator around the corresponding electrode, a central feed cavity formed by recessing the abutting faces of the mold parts and adapted to receive a batch of glass, passages cut in the abutting faces of the mold parts connecting the bottom of said feed cavity with the several mold cavities, and means adapted to force the molten glass from said feed cavity into said mold cavities, for the purpose described.

5. In apparatus for forming glass insulators for spark plugs, the combination of a one-piece mold bottom provided with a plurality of sockets adapted to receive and support the ends of electrodes, hinged mold members resting on said mold bottom and having their abutting faces recessed so as to form, when the mold is closed, a mold cavity, axially alined with each of said electrode sockets in said base, of proper contour for casting an insulator around the corresponding electrode, the abutting faces of the mold parts being provided with means for gripping and anchoring the upper ends of said electrodes when the mold is closed, a central feed cavity formed by recessing the abutting faces of the mold parts and adapted to receive a batch of glass, passages cut in the abutting faces of the mold parts and connecting the bottom of said feed cavity with the several mold cavities, and means for forcing the molten glass from said feed cavity into said mold cavities, for the purpose described.

Signed at Pittsburgh, Pa., this 25th day of July, 1919.

FRANK A. HOWARD.